US009275460B2

(12) United States Patent
Pack

(10) Patent No.: US 9,275,460 B2
(45) Date of Patent: Mar. 1, 2016

(54) REFERENCE ORIENTATIONS FOR VIEWING PANORAMIC IMAGES

(71) Applicant: Google Inc., Mountain View, CA (US)

(72) Inventor: Jeremy Bryant Pack, Mountain View, CA (US)

(73) Assignee: Google Inc., Mountain View, CA (US)

( * ) Notice: Subject to any disclaimer, the term of this patent is extended or adjusted under 35 U.S.C. 154(b) by 508 days.

(21) Appl. No.: 13/653,934

(22) Filed: Oct. 17, 2012

(65) Prior Publication Data

US 2015/0161807 A1 Jun. 11, 2015

(51) Int. Cl.
H04N 7/00 (2011.01)
G06T 7/00 (2006.01)
H04N 5/232 (2006.01)
G06T 11/20 (2006.01)
G06T 17/05 (2011.01)

(52) U.S. Cl.
CPC .............. *G06T 7/004* (2013.01); *G06T 11/206* (2013.01); *G06T 17/05* (2013.01); *H04N 5/23229* (2013.01); *G06T 2207/30244* (2013.01)

(58) Field of Classification Search
CPC .... H04N 5/225; H04N 5/23229; G06T 11/60; G06T 7/004; G06T 2207/30244
USPC .......................................................... 348/36
See application file for complete search history.

(56) References Cited

U.S. PATENT DOCUMENTS

| 6,486,908 B1* | 11/2002 | Chen et al. ....................... 348/39 |
| 7,450,839 B2* | 11/2008 | Lee et al. ................. 348/E5.042 |
| 8,525,825 B2* | 9/2013 | Zhu et al. .......................... 348/36 |
| 8,600,194 B2* | 12/2013 | Doepke ........................... 382/294 |
| 2010/0302347 A1* | 12/2010 | Shikata ............................ 348/36 |
| 2012/0120188 A1* | 5/2012 | Arai et al. ........................ 348/36 |
| 2012/0293607 A1* | 11/2012 | Bhogal et al. ................... 348/36 |

* cited by examiner

Primary Examiner — Jorge L Ortiz Criado
Assistant Examiner — Benjamin Pezzner
(74) Attorney, Agent, or Firm — Lerner, David, Littenberg, Krumholz & Mentlik LLP

(57) ABSTRACT

Aspects of the present disclosure relates generally to deciding which part of a panoramic image is most important and using that as a reference point for displaying the panoramic image to user. For example, a 360 degree panoramic image associated with orientation and location information may be identified. Related images, for example, in content and location may also be identified. The related images may be projected as points on a unit circle representing the orientations of the panoramic image. The point farthest from an average location of the points may be removed until the average location of the points is at least a minimum distance from the center of the circle. When this occurs, an angular location of the average location relative to the circle may be identified as a reference orientation. The reference orientation may be associated with the panoramic image, and the association may be stored in memory.

20 Claims, 13 Drawing Sheets

REFERENCE ORIENTATIONS FOR VIEWING PANORAMIC IMAGES

BACKGROUND OF THE INVENTION

Various systems may provide users with images of different locations. Some systems provide users with panoramic images having a generally wider field of view. While there is no fixed definition of a panoramic image, panoramic images may include those which simply provide an unbroken view of a scene or more technically, images having a field of view which is greater than that of the human eye, for example, 180 degrees or greater. Some panoramic images may provide a 360 degree view of a location. In this regard, a panoramic image may comprise a single image or a series of images stitched together to form a single scene.

In some examples, systems which provide users with 360 degree panoramic images may store and access a large number of images associated with roads and other geographic features. When users request any panorama in a large geographic region, these systems may want to show them the most interesting or important panoramic image in the region as well as the portion of that image which is most interesting, important or useful. Because these images include the entire field of view for a location, determining which portion of this image is most interesting, important, or useful may be extremely difficult.

SUMMARY

One aspect of the disclosure provides a method. The method includes accessing a plurality of images, where each image of the plurality is associated with pose data; projecting a plurality of points onto a shape based on the pose data associated with the plurality of images; determining, by a processor, a viewing pose for viewing an image based on the plurality of points; and storing the viewing pose in memory.

In one example, the shape is a circle. In another example, the shape is a sphere. In another example, the method also includes using the viewing pose to define a portion of a panoramic image for display. In another example, the method also includes using the viewing pose to define a portion of a virtual environment for display.

In another example, the method also includes determining a viewing pose for viewing an image based on the plurality of points further includes determining an average location of the plurality of points; removing one point of the plurality of points located farthest from the average location of the plurality of points and recalculating the average location of the plurality of remaining points until the average location of the plurality of remaining points is at least a minimum distance from a center of the shape; and when the average location of the plurality of remaining points is at least the minimum distance from the center of the shape, using the average location of the plurality of remaining points to determine the viewing pose. In this example, the method also includes, when the average location of the plurality of points or the average location of the plurality of remaining points is exactly at the center of the unit circle removing a random point and subsequently recalculating the average location of the plurality of remaining points.

Another aspect of the disclosure provides a system. The system includes memory storing a plurality of images. Each image of the plurality is associated with pose data. The system also includes a processor configured to: project a plurality of points onto a shape based on the pose data associated with the plurality of images; determine a viewing pose for viewing an image based on the plurality of points; and store the viewing pose in the memory.

In one example, the shape is a circle. In another example, the shape is a sphere. In another example, the processor is also configured to use the viewing pose to define a portion of a panoramic image for display. In another example, the processor is also configured to use the viewing pose to define a portion of a virtual environment for display.

In another example, the processor is also configured to determine the viewing pose by determining an average location of the plurality of points; removing one point of the plurality of points located farthest from the average location of the plurality of points and recalculating the average location of the plurality of remaining points until the average location of the plurality of remaining points is at least a minimum distance from a center of the shape; and when the average location of the plurality of remaining points is at least the minimum distance from the center of the shape, using the average location of the plurality of remaining points to determine the viewing pose. In this example, the processor is also configured to, when the average location of the plurality of points or the average location of the plurality of remaining points is exactly at the center of the unit circle, remove a random point and subsequently recalculate the average location of the plurality of remaining points.

A further aspect of the disclosure provides a non-transitory, tangible computer-readable storage medium on which computer readable instructions of a program are stored. The instructions, when executed by a processor, cause the processor to perform a method. The method includes accessing a plurality of images, where each image of the plurality is associated with pose data; projecting a plurality of points onto a shape based on the pose data associated with the plurality of images; determining, by a processor, a viewing pose for viewing an image based on the plurality of points; and storing the viewing pose in memory.

In one example, the shape is a circle. In another example, the shape is a sphere. In another example, the method also includes using the viewing pose to define a portion of a panoramic image for display. In another example, the method also includes using the viewing pose to define a portion of a virtual environment for display.

In another example, the method also includes determining a viewing pose for viewing an image based on the plurality of points further includes determining an average location of the plurality of points; removing one point of the plurality of points located farthest from the average location of the plurality of points and recalculating the average location of the plurality of remaining points until the average location of the plurality of remaining points is at least a minimum distance from a center of the shape; and when the average location of the plurality of remaining points is at least the minimum distance from the center of the shape, using the average location of the plurality of remaining points to determine the viewing pose.

DETAILED DESCRIPTION

In one example, a 360 degree panoramic image associated with orientation and location information may be identified. A cluster of other images may also identified based on the location of the other images and the location information. The other images of the cluster may be projected as points on a unit circle. The center of the unit circle may be determined from the location information. An average location of the points may be determined. The point farthest from the average location of the points may be removed, and a new average location for any remaining points may be determined. When the new average location of the points is at least a minimum distance from the center of the unit circle, an angular location of the average location relative to the unit circle may be identified as a reference orientation. The reference orientation may be associated with the 360 degree panoramic image, and the association may be stored in memory. This process may be repeated for a plurality of 360 degree panoramic images.

Figure 1:
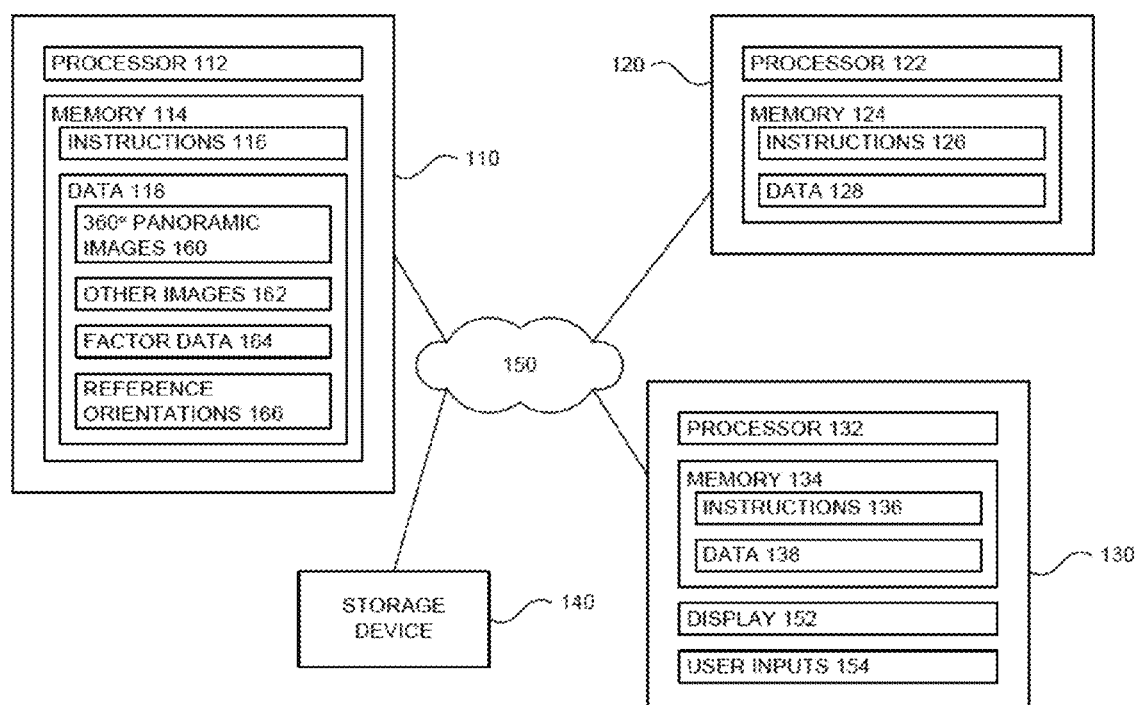
FIG. 1 is a functional diagram of a system in accordance with aspects of the disclosure.
Figure 2:
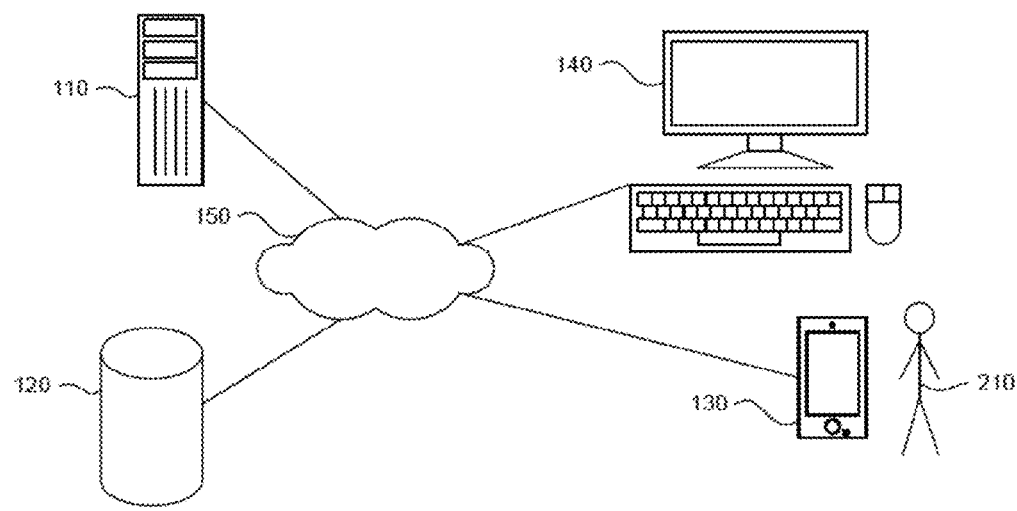
FIG. 2 is a pictorial diagram of the system of FIG. 1.

As shown in FIGS. 1-2, an exemplary system 100 may include devices 110, 120, 130, and 140. Device 110 may include a computer having a processor 112, memory 114 and other components typically present in general purpose computers. Memory 114 of computer 110 may store information accessible by processor 112, including instructions 116 that may be executed by the processor 112.

Memory may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. In this regard, memory may be a hard drive or other storage media located in a housing different from that of computer 110. For example, all or portions of data 118 may actually refer to storage associated with another device, such as storage device 140 at another network location. Storage device 140 may include a database, hard drive, server or other storage system that is accessible by server 110.

The computer 110 may be at one node of a network 150 and capable of directly and indirectly communicating with other nodes, such as devices 120, 130, and 140 of the network. For example, computer 110 may comprise a web server that is capable of receiving data from devices 120, 130 and 140 via network 150 such that server 110 may use network 150 to transmit and display information to a user.

Devices 120 and 130 may include a client device configured to allow a user to communicate with server 110 and perform other tasks. In this regard, client devices 120 and 130 may be configured similarly to the computer 110, with processors 122, 132, memory 124, 134, instructions 126, 136, and data 128, 138, each similar to processor 112, memory 114, instructions 116, and data 118, respectively.

In one example, client device 130 may be a personal computer, intended for use by a user 210, having all the components normally found in a personal computer. Such components may include, for example, a central processing unit 132 (CPU), display device 152, CD-ROM, hard-drive, user inputs 154, camera, speakers, modem and/or network interface device, and all of the components used for connecting these elements to one another. The display device 152 may include a monitor having a screen, a projector, a touch-screen, a small LCD screen, a television, or another device such as an electrical device that is operable to display information processed by the processor. The user inputs 154 may include a mouse, keyboard, touchscreen (for example, as part of display device 152), microphone, etc. In this regard, a user may input information into client device 130 via user inputs 154, and the input information may be transmitted by CPU 132 to computer 110. By way of example only, client device 130 may be a wireless-enabled PDA, hand-held navigation device, tablet PC, netbook, music device, or a cellular phone.

Although the examples of FIGS. 1 and 2 depict only a few devices, computer 110 may be in communication with a plurality of different devices. Moreover, devices and computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although some functions are indicated as taking place on a single computer having a single processor, various aspects of the system and method may be implemented by a plurality of computers, for example, communicating information over network 150. In this regard, computer 110 may also include a web server capable of communicating with the client devices 120 and 130 as well as storage device 140. Server 110 may also include a plurality of computers (e.g., a load balanced server farm), that exchange information with different nodes of a network for the purpose of receiving, processing and transmitting data to the client devices. In this instance, the client devices will typically still be at different nodes of the network than any of the computers comprising server 110. Accordingly, references to a processor, computer, or memory will be understood to include references to a collection of processors, computers, or memories that may or may not operate in parallel.

The network 150 and intervening nodes described herein, may be interconnected via wires and/or wirelessly using various protocols and systems, such that each may be part of the Internet, World Wide Web, specific intranets, wide area networks, or local networks. These may use standard communications protocols or those proprietary to one or more companies, Ethernet, WiFi, HTTP, ZigBee, Bluetooth, infrared (IR), etc., as wells various combinations of the foregoing.

Returning to FIG. 1, data 118 of computer 110 (and/or storage device 140) may store 360 degree panoramic images 160. As noted above, each 360 degree panoramic image may provide a 360 degree field of view for a given location. Thus, when presented to a user, a 360 degree panoramic image may be rotated to give the user the feeling that he or she is at the center of a given location and able to view a complete 360 degree view of the surrounding area. Again, the 360 degree panoramic image may actually comprise a series of images stitched together to form a complete 360 degree scene. Images with less than a 360 degree field of view may not be considered 360 degree panoramic images.

Each 360 degree panoramic image may also be associated with location information. For example, the location information may include geographic location information indicating where the image was captured as well as pose data or vertical (up/down) and/or horizontal orientation information (for example, which portion of the panoramic image is oriented towards North or some other reference).

In addition to storing the various 360 degree images, data 118 may also include other images 162. For example, the other images may include street level images (for example, (images of the environment taken by a camera on a vehicle as the vehicle drives along a roadway), images submitted by users, images provided by image services, etc. In this regard, the other images may include non-panoramic and varying degrees of panoramic images (such as those with 180 to 360 degree fields of view). The other images may also be pre-filtered for quality, relevance, content, etc. Again, the location information may include geographic location information indicating where the other images were captured as well as pose data or vertical (up/down) and horizontal (0 degrees to 360 degree) orientation information.

In some examples, data 118 may also store "preferred" 360 degree panoramic images. These images may be stored separately, for example, as a distinct set or group of images, or alternatively, the 360 degree panoramic images 160 may be associated with some identifier or reference indicating whether the 360 degree panoramic image is a preferred image. A preferred 360 degree panoramic image may have been previously identified as the most important, relevant, useful, etc. for a given location or area. As described in more detail below, these images may be identified using the factors of factor data 164.

The factor data 164 may include various factors associated with each 360 degree panoramic images. These factors may include, for example, the number of other images 162 to which a given 360 degree panoramic image is connected, such as by line of sight (based on 3D information gathered using image processing or lasers), by road network connectivity, by shared features, by proximity (from geolocation), as well as by various corresponding color and image properties.

The factor data 164 may also include other factors related to a given 360 degree panoramic image such as: the number of known interesting locations in the image, such as landmarks, buildings, bridges, monuments, businesses, waterways, and parks; whether any important events future or historic event, such as a parade, march, festival, etc., has or will occur at or near the location of the given 360 degree panoramic image; whether any event was occurring when the image was taken; the weather when the given 360 degree panoramic image was captured; the type of road the given 360 degree panoramic image is associated with, such as a local road, service road, bridge, tunnel, highway, etc.; the quality of the camera used to capture the given 360 degree panoramic image; the density of other panoramic images near the 360 given degree panoramic image; the age of the image or how long ago it was captured; the time of day the image was captured; whether the image was captured at an interesting time of day for that particular location, for example, some locations may be more interesting at night, while most places may be better for photographic purposes during daylight hours; and the popularity of the 360 degree panoramic image, or the number of people who routinely view the 360 degree panoramic image.

Data 118 may also store associated reference orientations 166 identified for each of the preferred 360 degree panoramic images. These references orientations may identify a preferred horizontal (and in some examples, vertical) viewpoint or viewing angle for a given preferred 360 degree panoramic image. For example, the reference orientation may define a portion of a 360 degree panoramic image for display.

As described in more detail below, a reference orientation may be used as a best or canonical view of a preferred 360 degree panoramic image. In some examples, a reference orientation may be identified such that it maximizes the number of other images that are also pointed in the direction or orientation of the identified reference orientation. As with the preferred 360 degree panoramic images, the reference orientations 166 may be stored directly with the 360 degree panoramic images or in a table or database which cross references the associated reference orientations and preferred 360 degree panoramic images. In this regard, given a particular 360 degree panoramic image, the server 110 may quickly identify the associated reference orientation from reference orientations 166.

In addition to the operations described below and illustrated in the figures, various operations will now be described. The following operations do not have to be performed in the precise order described below. Rather, various steps may be handled in a different order or simultaneously. Steps may also be added or also omitted unless otherwise stated.

The server 110 may identify a preferred 360 degree panoramic image for a particular location or area using various factors. For example, the computer may determine a most interesting, relevant, or useful 360 degree panoramic image for a given location by weighing or comparing a number of different factors of factor data 164. In this regard, different factors may be given different weights. For example, the popularity of a 360 degree panoramic image may be given less weight than quality of the image because the popularity factor may be more susceptible to abuse. The popularity factor may even result in feedback loops where a given 360 degree panoramic images determined to be "important" become even more so simply because that image was labeled as important, interesting, etc.

When weighting the factors described above, the system may initially rely on information provided manually. For example, in order to determine the relative importance of these various features of an image, people with knowledge of specific local areas may rank any 360 degree panoramic images of that local area against each other. For example, a feature of an image may include any characteristic of a 360 degree panoramic image or place, any geographic information near the location of the 360 degree panoramic image, as well as any information about how users interact with the 360 degree panoramic image, such as how long users spend looking at the image, whether users tend to zoom in or out, whether they prefer one particular 360 degree panoramic image over another, etc. This may then allow for the use of machine learning to automatically determine how to weigh the factors.

Figure 3:
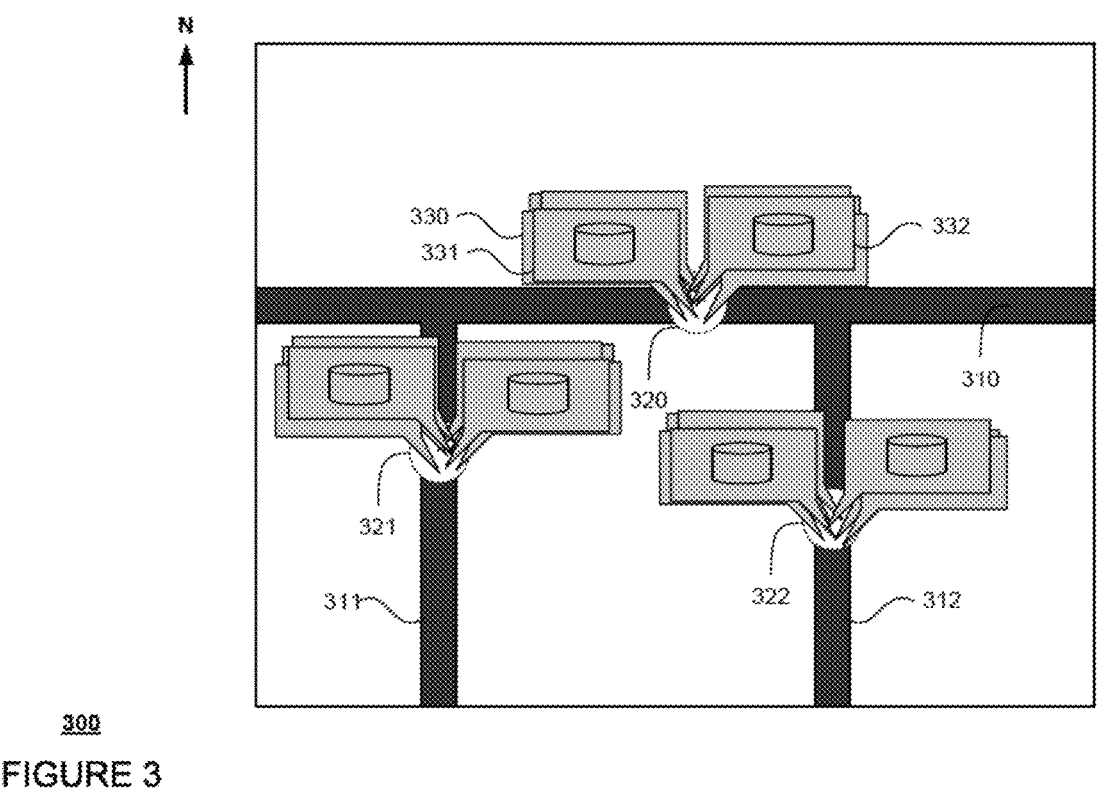
FIG. 3 is a diagram of a map and corresponding locations of 360 degree panoramic images in accordance with aspects of the disclosure.

For example, map 300 of FIG. 3 depicts an example of the geographic locations of various 360 degree panoramic images 160 of data 118. In this example, map 300 includes a number of roadways 310-312. The map includes various areas 320-322 associated with 360 degree panoramic images. For example, area 320 is associated with at least 360 degree panoramic images 330-332. For clarity, only a few areas and 360 degree panoramic images, however the 360 degree panoramic images 160 of data 118 and areas processed by server 110 may include significantly more images and areas.

Figure 4:
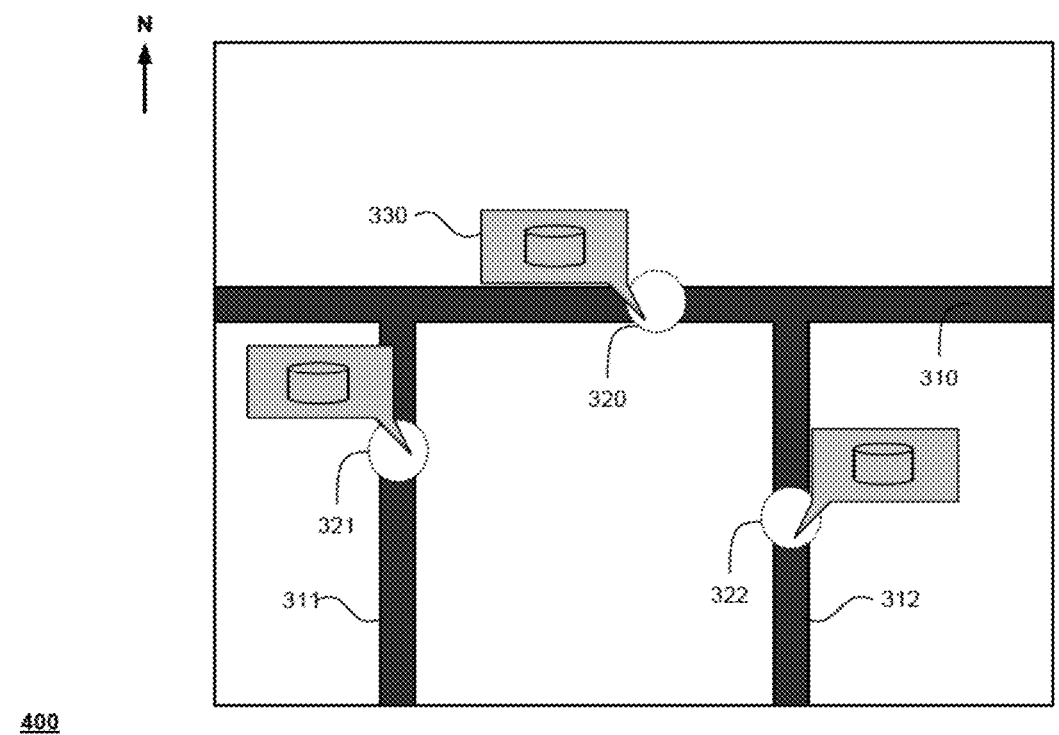
FIG. 4 is another diagram of a map and corresponding locations of 360 degree panoramic images in accordance with aspects of the disclosure.

Map 400 of FIG. 4 depicts an example of the preferred 360 degree panoramic images determined for each of areas 320-322 of map 300. In this regard, 360 degree panoramic image 330 has been identified as the preferred 360 degree panoramic image for area 320. Again, the preferred may be identified, for example using the factors of factor data 164 as described above.

Once a preferred 360 degree panoramic image has been identified for a particular location or area, the computer 110 may then determine a "best" view or reference orientation for viewing that 360 degree panoramic image. This process may focus on the panoramic images which are associated with a large number of other images. For example, while a single other image would be sufficient, the more other images available for a particular 360 degree panoramic image, the more accurate or useful the determination of the reference orientation may be. Thus, returning to FIG. 4, 360 degree panoramic image may be associated with a large number of other images. In this regard, the number of other (panoramic and non-panoramic) images to which the given 360 degree panoramic image is connected may be given more weight than any of the other factors described above.

Thus, any 360 degree panoramic images which are not associated with a large number of other images may not necessarily be identified as a preferred image. However, where a 360 degree panoramic image is identified which is not associated with a large number of other images, a user may manually identify a reference orientation. In another example, if there are known points of interest nearby which are likely to be captured in the preferred 360 degree panoramic image, server 110 may use the location of the point of interest relative to where the identified 360 panoramic image was captured as the reference orientation. For example, if the preferred 360 degree panoramic image 330 is near a bridge the server 110 may select a reference orientation that would orient the preferred 360 degree panoramic image towards that bridge. Similar examples may include reference orientations that would orient the preferred 360 degree panoramic 330 image towards other points of interest such as a body of water, the nearest store, etc.

The server 110 may also process the other images 162. For example, the server may use a heuristic algorithm to cluster the other images and orient them in space. For example, these heuristics may include factors such as whether there are and the number of any similar or corresponding objects between other images (such as whether two other images look at the same building or how many objects the two images have in common), the proximity of the other images in space, similarity of geographic features between other images (such as mountains, villages, cities, etc.), colors between other images, the type of road from which the other image was taken (highway, tunnel, bridge, freeway, walkway, etc.), the purpose and source of the other images (street level images or the type of street level images, submitted by users, provided by image services, whether the other image is part of a special collection of images collected or taken for a particular purposes, etc.), etc.

Figure 5:
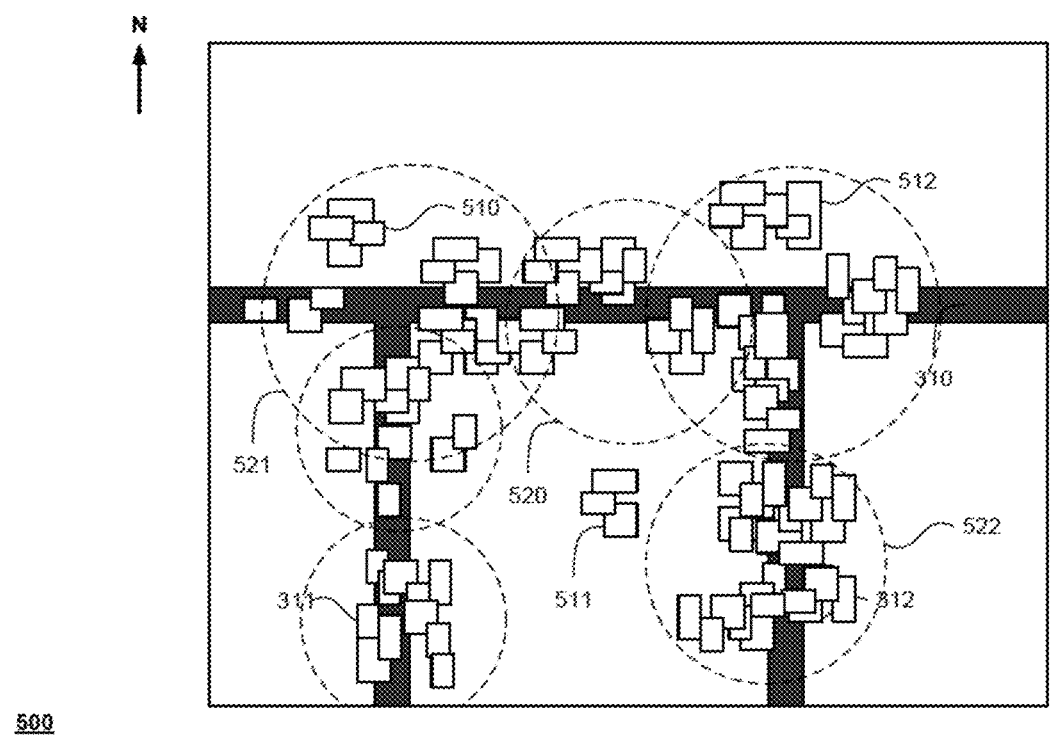
FIG. 5 is a diagram of a map and corresponding of other images in accordance with aspects of the disclosure.

Map 500 of FIG. 5 depicts an example of the geographic locations of various other images 162. In this example, map 500 includes other images 510-512, though each box depicted may represent one or more other images. The images may also be associated with one or more clusters 520-522. The example clusters generally depict locational relationships for simplicity, however, other more complex relationships may also be used when clustering the other images. Again, only a few other images and clusters are depicted in FIG. 5, however the other images 162 of data 118 and clusters processed by server 110 may include significantly more other images and clusters.

Figure 6:
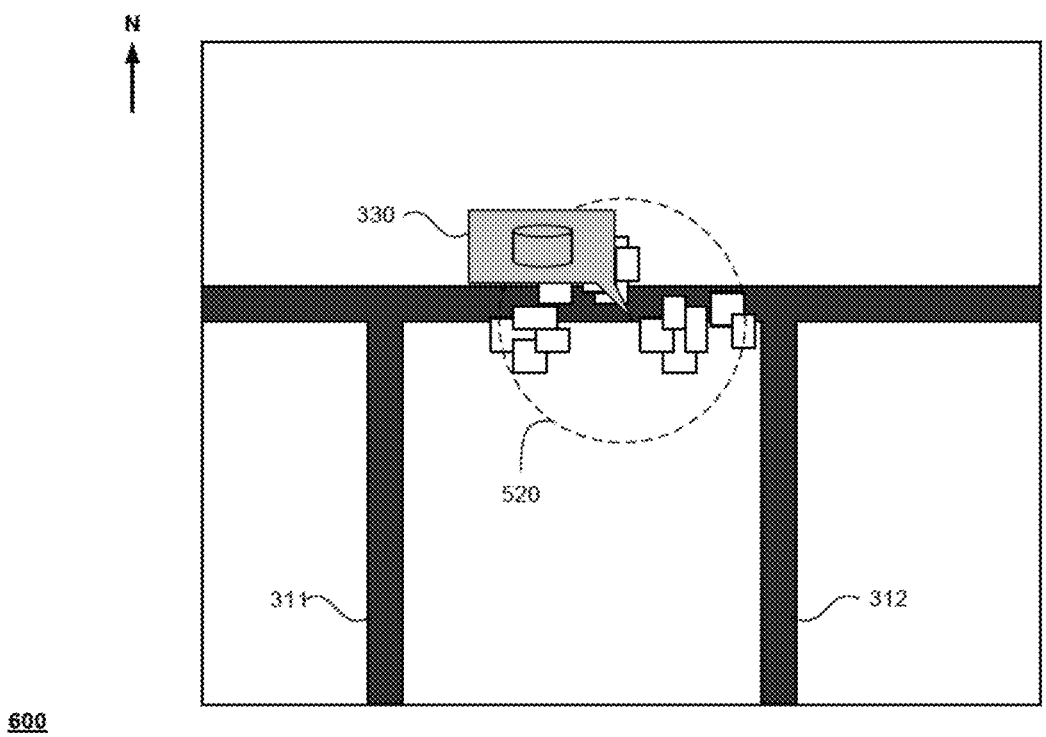
FIG. 6 is another diagram of a map and corresponding locations of a 360 degree panoramic image and other images in accordance with aspects of the disclosure.

The server 110 may also compare the location and content of the clusters of images to that of a given preferred 360 degree panoramic image in order to identify a cluster of other images that are likely to be taken at or near the location at which the preferred 360 panoramic image was taken. For example, map 600 of FIG. 6, depicts the cluster of other images 520 that the server 110 may determine are likely to be taken at or near the location at which preferred 360 degree panoramic images 330 was taken.

Once a cluster is identified for the given preferred 360 degree panoramic image, the server 110 may further process the other images of that cluster. This processing may include, for example, image matching may be used to discard any images of the identified which do not actually contain content associated with the preferred 360 degree panoramic images.

The remaining other images in the identified cluster may be projected as points on a shape. In one example, the shape may include a unit circle. The center of the unit circle may represent the location from which the preferred 360 degree panoramic image was captured, and the circle itself may represent the various angles and locations of the 360 degree field of view of the preferred 360 degree panoramic image. The server 110 may then use the horizontal orientation or center of the field of view of each of the other images of the cluster and the location of each other image relative to those of the given preferred 360 degree panoramic image to project a point for that other image at some location along circumference of the unit circle.

Figure 7:
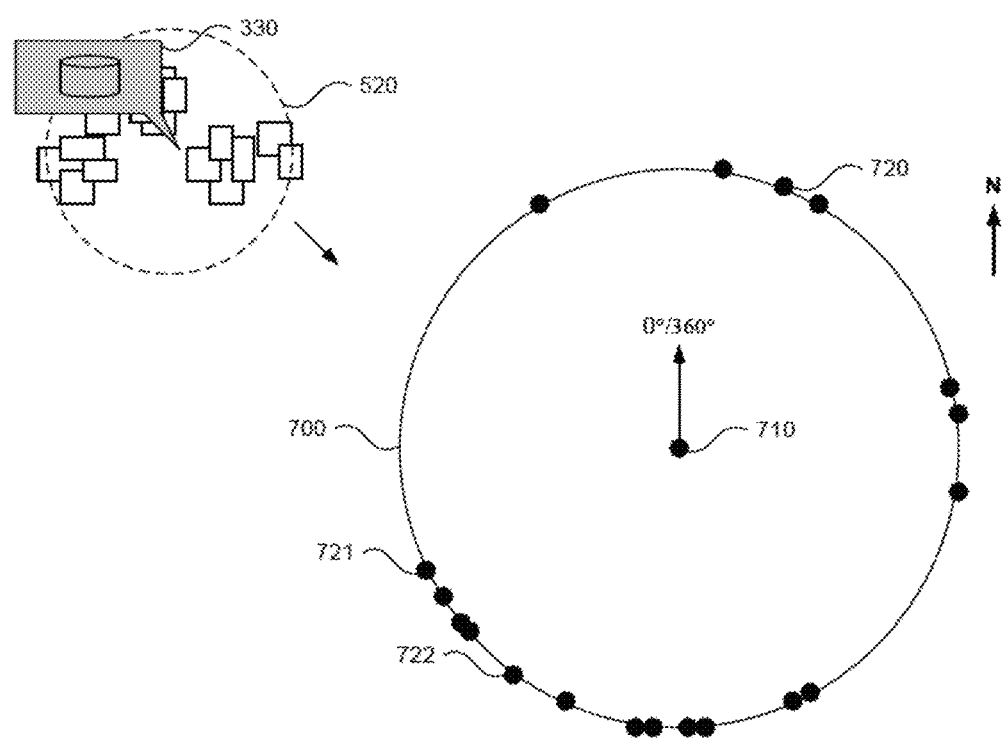
FIG. 7 is a diagram of a unit circle with other images projected as points on the unit circle in accordance with aspects of the disclosure.

FIG. 7 depicts an example unit circle 700. In this example, the center 710 of unit circle 700 represents the location at which the 360 degree panoramic image 330 was captured. The other images of cluster 520 have been projected along the circumference of the unit circle as points such as points 720-722 based on the orientation and locations of the other images relative to preferred 360 degree panoramic image 330.

Figure 8:
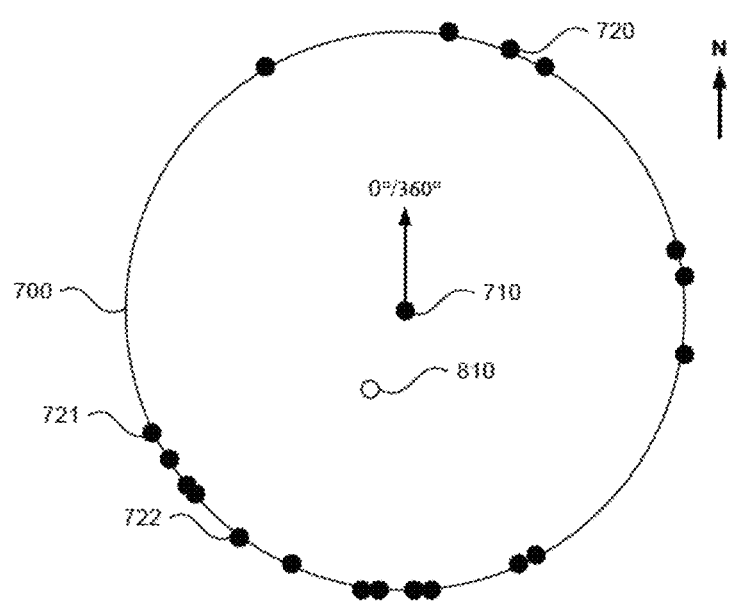
FIG. 8 is another diagram of a unit circle with other images projected as points on the unit circle in accordance with aspects of the disclosure.

The average location of the points may then be determined. For example, the average location may be determined using a simple mean of all of the location such that the average location is somewhere within the circle or along the outer edge of the circle. The point representing the location farthest from the average location may be discarded, and a new average location may be determined. If the average location of the points is exactly at the center of the circle, a random point (and therefore image) may be discarded, and a new average location may be determined. Similarly, anytime there are two or more points which are both the farthest from the average location of the points (and thus also the same distance from the average location of the points), a random point or a random point of any of the two or more points may be discarded. For example, as shown in FIG. 8, the average of the points along unit circle 700 of FIG. 7 may be the location of point 810. In this example, the point located farthest from point 810 may be point 720. Thus, turning to FIG. 9, point 720 may be removed (shown in dashed-line), and a new average location 910 may be determined.

This process of discarding points may continue until the average location of the points is at least some minimum distance from the center of the unit circle. For example, if the minimum distance is 90% of the radius distance from the center of the circle, the resulting points (and image cluster) would be closer together than if the minimum distance is 80% of the radius distance from the center of the circle. The angular location of the current average location of the remaining points may then be used as the reference orientation for the panoramic image.

Figure 9:
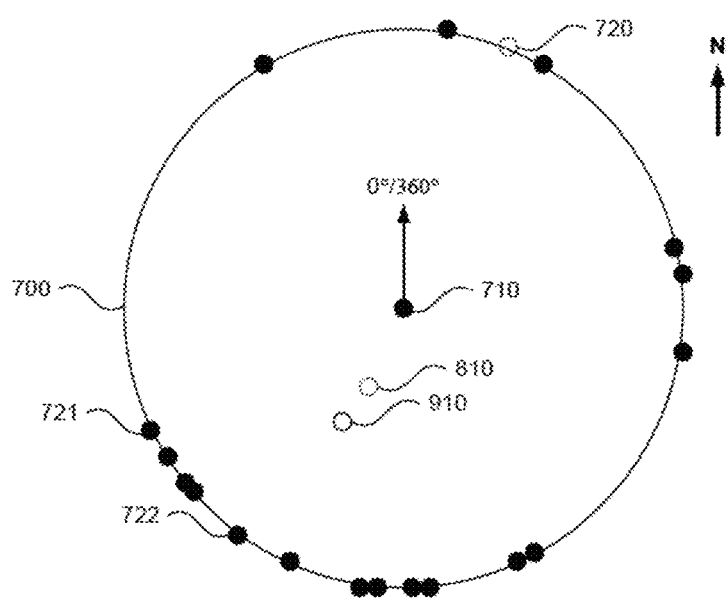
FIG. 9 is a further diagram of a unit circle with other images projected as points on the unit circle in accordance with aspects of the disclosure.
Figure 10:
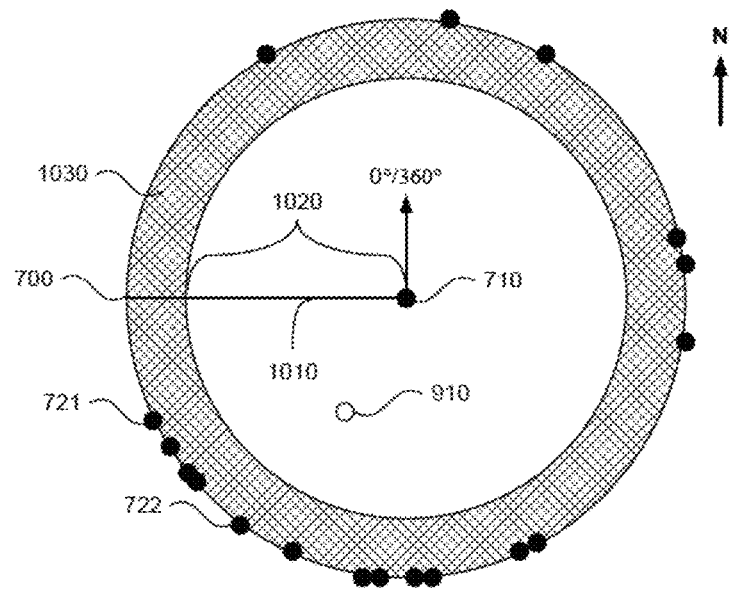
FIG. 10 is a diagram of a unit circle with other images projected as points on the unit circle in accordance with aspects of the disclosure.

For example, FIG. 10 depicts the unit circle of FIG. 9 and radius 1010. In this example, the minimum distance 1020 from the center 710 of unit circle 700 is about 75% along the radius 1010 from the center 710 of unit circle 700 (or alternatively 25% from the circumference of unit circle 700. Here, average 910 is not the minimum distance 1020 (or not within area 1030 shown in cross hatch for clarity). As noted above the point farthest from the new average location 910 may be removed, and a new average determined. This may continue until the new average is within area 1030 or at least the minimum distance 1020 from the center 710 of unit circle 700.

In addition to using the horizontal orientation at which the other images were taken, the computer may also consider the vertical orientation (how far the camera is tilted up or down) when projecting the images as points. Thus, rather than a unit circle, the shape used may include a sphere. For example, it may make more sense to angle the reference orientation of a panoramic image upward to better view a taller item such as a sky scraper or tall monument. Similarly, it may make more sense to angle the reference orientation of a panoramic image downward to view an item closer to the ground such as a lake.

In some examples, when determining the appropriate vertical orientation, the number of other images may be of particular importance. For example, it may be less useful to change the vertical orientation up or down unless there are a very large number of other images oriented in that direction. For example, the system may require at least X (such as 10 or 25 other images) other images or projected points pointed upwards for every Y (such as 5 or 20 other images) other images projected in pointed in any other direction.

In some examples, other factors associated with the images may be used to weight the points projected on the unit circle or unit sphere. For example, the quality of the image may be used as a weighted factor. Thus, the average location of the points may actually be a weighted average, rather than a simple mean, where the location of points associated with higher quality other images may be given greater weight than the location of points associated with lower quality images. In addition, as the aspects described above utilize a Euclidian distance, any number of dimensions (2, 3, 4, etc.) may be used.

The identified reference orientation may then be associated with the preferred 360 degree panoramic image. The reference orientations and associations may then be stored in the memory, for example, as the reference orientations 166 described above.

Figure 11:
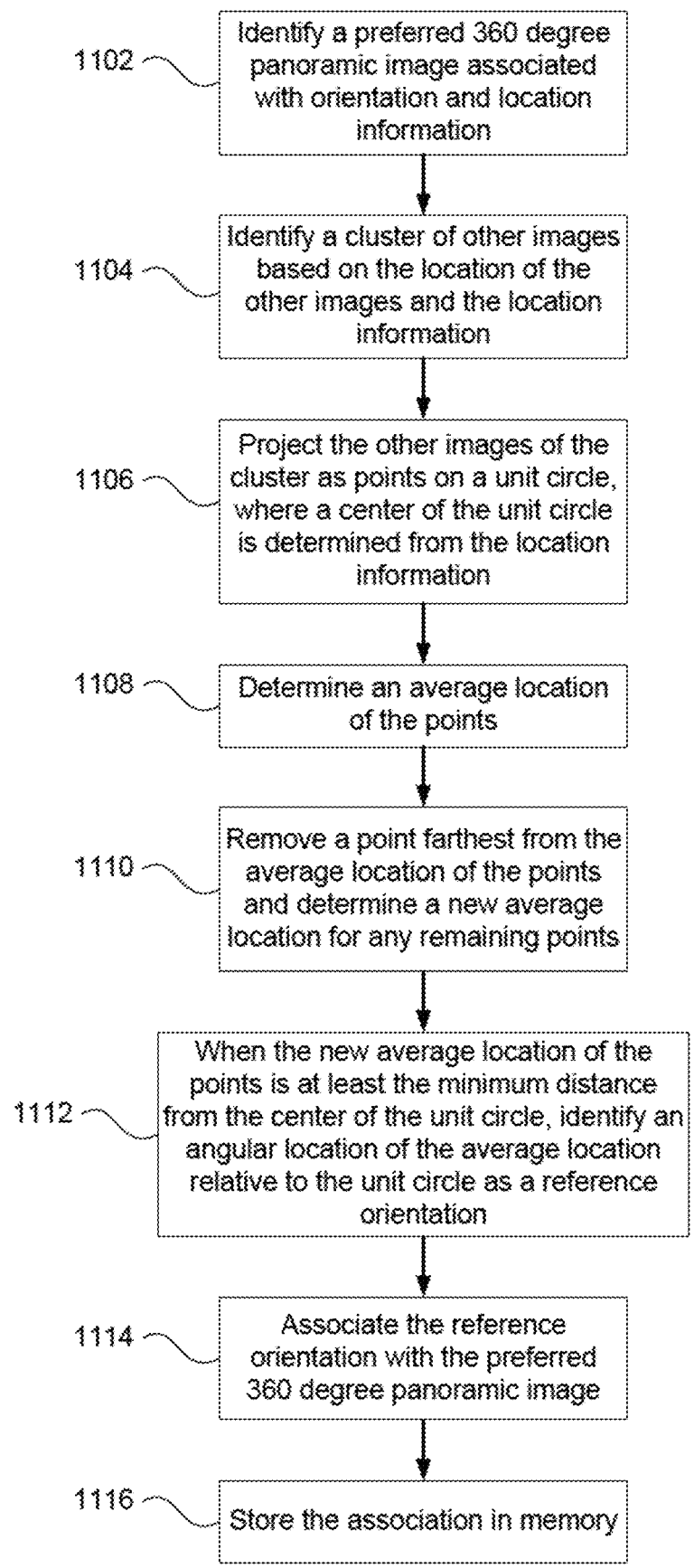
FIG. 11 is a flow diagram in accordance with aspects of the disclosure.

Flow diagram 110 of FIG. 11 is an example of some of the aspects described above as performed by a server 110. For example, a preferred 360 degree panoramic image associated with orientation and location information is identified at block 1102. A cluster of other images is identified based on the location of the other images and the location information at block 1104. The other images of the cluster are projected as points on a unit circle at block 1106. A center of the unit circle is determined from the location information. An average location of the points is determined at block 1108. A point farthest from the average location of the points is removed and a new average location for any remaining points is determined at block 1110. When the new average location of the points is at least a minimum distance from the center of the unit circle, an angular location of the average location relative to the unit circle is identified as a reference orientation at block 1112. The reference orientation is associated with the preferred 360 degree panoramic image, and the association is stored in memory at block 1114 and 1116, respectively. This process may be repeated for each preferred 360 degree panoramic image.

Figure 12:
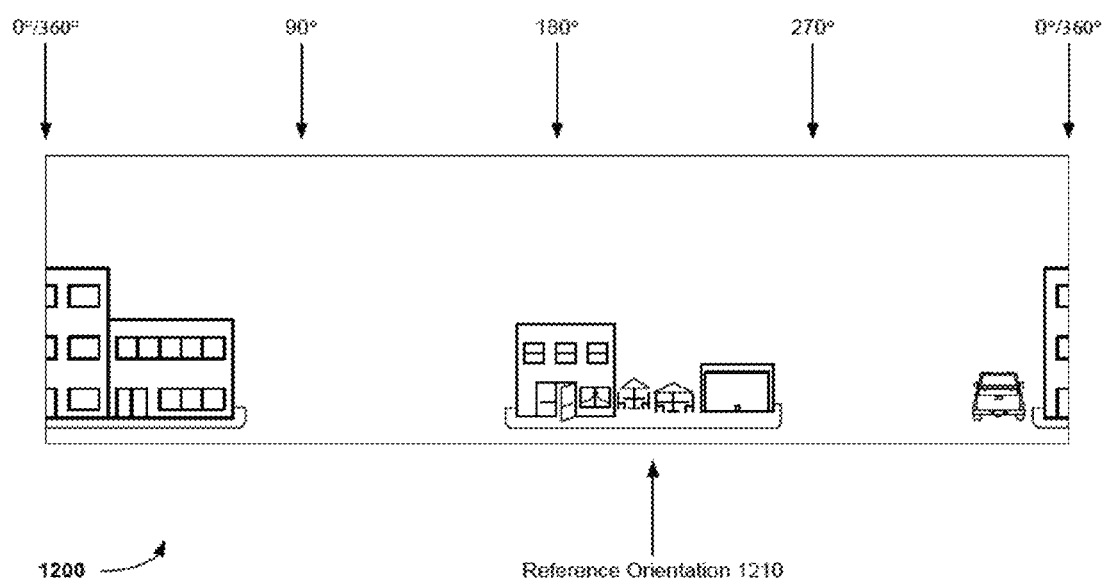
FIG. 12 is an example preferred 360 degree panoramic image and a reference orientation in accordance with aspects of the disclosure.

These associations may then be used to provide images to users. For example, a user, using a client device such as client device 120 or 130 may send a request to server 110 for a panoramic image. This request may specify a particular location or otherwise provide information which may be used to identify one of the preferred 360 degree panoramic images. In response, server 110 may use the information in the request to identify a given one of the preferred 360 degree panoramic images. Once the 360 degree panoramic image is identified, the computer may identify the associated reference orientation. For example, FIG. 12 is an example of a preferred 360 degree panoramic image 1200. As shown in this example, the preferred 360 degree panoramic image 1200 includes the same detail at 0 degrees and 360 degrees. The reference orientation 1210 is also identified at some location between 180 degrees and 270 degrees.

Figure 13:
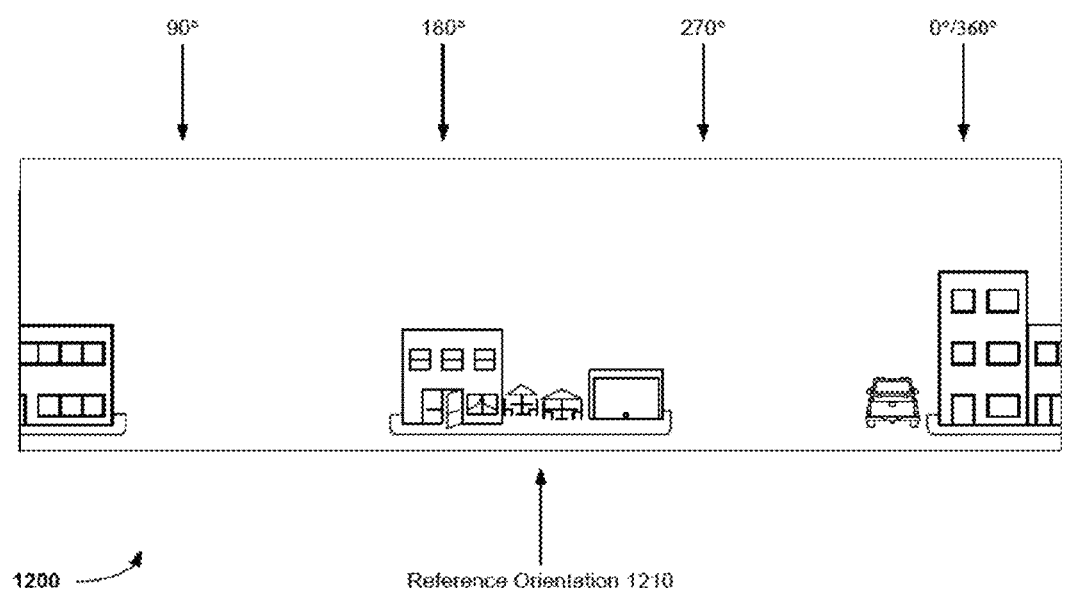
FIG. 13 is another example preferred 360 degree panoramic image and a reference orientation in accordance with aspects of the disclosure.

The preferred 360 degree panoramic image as well as the associated reference orientation may be sent to the client device. The client device may then use the reference orientation to display the panoramic image to the user. For example, the reference orientation may be positioned as the center of that portion of the preferred 360 degree panoramic image initially displayed to the user. The user may then rotate the preferred 360 degree panoramic image to view other orientation or additional portions of the preferred 360 degree panoramic image if only a portion is initially displayed. FIG. 13 is another example of the preferred 360 degree panoramic image 1200 as it may initially be displayed to a user. In this example, the reference orientation 1210 is displayed at the center of the preferred 360 degree panoramic 1200. In other words, from FIG. 12 to FIG. 13, the preferred 360 degree panoramic image has been shifted so that the focus of the image presented to the user is the reference orientation 1210.

The features described above may be used to determine a reference orientation for various other types of imagery in addition to 360 degree panoramic images. For example, rather than a 360 degree panoramic image, a reference orientation for a virtual environment, such as a three-dimensional terrain environment including various features such as roadways, buildings, waterways, vegetation, etc., may be determined. In this regard, the reference orientation may define a portion of the three-dimensional representation of a virtual environment for display.

As noted above, the features described herein allow a computer to identify a reference orientation or a view for a 360 degree image that maximizes the number of other images that are also pointed in the direction of the identified reference orientation. In this regard, the server may automatically select a "best" or "canonical" view of a 360 degree panoramic image, allowing someone who is viewing the image to immediately focus on the portion of the 360 degree panoramic image which other people had found most interesting, relevant, etc.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A method comprising:
   accessing a plurality of images, each image of the plurality being associated with pose data identifying an orientation of the image with respect to a location at which the image was captured and each image of the plurality having a less than 360 degree field of view;
   projecting, by one or more processors, a plurality of points onto a circular shape based on the pose data associated with the plurality of images, wherein a center of the shape represents a location at which a panoramic image having a 360 degree field of view was captured and each point of the plurality of points represents a respective one of the plurality of images such that the projected points correspond to the plurality of images on a one-to-one basis;
   determining, by the one or more processors, an average location of the projected plurality of points around the circular shape;
   determining, by the one or more processors, a viewing pose identifying a reference orientation for viewing the panoramic image based on the average location of the projected plurality of points;
   and storing the viewing pose in memory.

2. The method of claim 1, wherein the shape is a unit circle.

3. The method of claim 1, wherein the shape is a sphere.

4. The method of claim 1, further comprising using the viewing pose to define a portion of a panoramic image for display.

5. The method of claim 1, further comprising using the viewing pose to define a portion of a virtual environment for display.

6. The method of claim 1, wherein determining a viewing pose for viewing an image based on the plurality of points further includes:
   after determining the average location of the plurality of points,
   removing one point of the projected plurality of points located farthest from the average location of the plurality of points and recalculating the average location of any remaining points of the projected plurality of points until the average location of the any remaining points is at least a minimum distance from a center of the shape; and
   when the average location of the any remaining points is at least the minimum distance from the center of the shape, using the average location of the any remaining points to determine the viewing pose.

7. The method of claim 6, further comprising, when the average location of the projected plurality of points or the average location of the any remaining points is exactly at the center of the shape removing a random point and subsequently recalculating the average location of the any remaining points.

8. A system comprising:
   memory storing a plurality of images, each image of the plurality being associated with pose data identifying an orientation of the image with respect of a location at which the image was captured and each image of the plurality having a less than 360 degree field of view;
   a processor configured to:
   project a plurality of points onto a circular shape based on the pose data associated with the plurality of images, wherein a center of the shape represents a location at which a panoramic image having a 360 degree field of view was captured and each point of the plurality of points represents a respective one of the plurality of images such that the projected points correspond to the plurality of images on a one-to-one basis;
   determine an average location of the projected plurality of points around the shape;
   determine a viewing pose identifying a reference orientation for viewing the panoramic image based on the average location of the projected plurality of points; and
   store the viewing pose in the memory.

9. The system of claim 8, wherein the shape is a unit circle.

10. The system of claim 8, wherein the shape is a sphere.

11. The system of claim 8, wherein the processor is further configured to use the viewing pose to define a portion of a panoramic image for display.

12. The system of claim 8, wherein the processor is further configured to use the viewing pose to define a portion of a virtual environment for display.

13. The system of claim 8, wherein the processor is further configured to determine the viewing pose by:
   after determining the average location of the projected plurality of points,
   removing one point of the projected plurality of points located farthest from the average location of the projected plurality of points and recalculating the average location of any remaining points of the projected plurality of points until the average location of any remaining points is at least a minimum distance from a center of the shape; and when the average location of the any remaining points is at least the minimum distance from the center of the shape, using the average location of the any remaining points to determine the viewing pose.

14. The system of claim 13, wherein the processor is further configured to, when the average location of the projected plurality of points or the average location of the any remaining points is exactly at the center of the shape, remove a random point and subsequently recalculate the average location of the any remaining points.

15. A non-transitory, tangible computer-readable storage medium on which computer readable instructions of a program are stored, the instructions, when executed by a processor, cause the processor to perform a method, the method comprising:

accessing a plurality of images, each image of the plurality being associated with pose data identifying an orientation of the image with respect of a location at which the image was captured and each image of the plurality having a less than 360 degree field of view;

projecting a plurality of points onto a circular shape based on the pose data associated with the plurality of images, wherein a center of the shape represents a location at which a panoramic image having a 360 degree field of view was captured and each point of the plurality of points represents a respective one of the plurality of images such that the projected points correspond to the plurality of images on a one-to-one basis;

determining an average location of the projected plurality of points around the shape;

determining a viewing pose identifying a reference orientation for viewing the panoramic image based on the average location of the projected plurality of points; and storing the viewing pose in memory.

16. The medium of claim 15, wherein the shape is a unit circle.

17. The medium of claim 15, wherein the shape is a sphere.

18. The medium of claim 15, further comprising using the viewing pose to define a portion of a panoramic image for display.

19. The medium of claim 15, further comprising using the viewing pose to define a portion of a virtual environment for display.

20. The medium of claim 15, wherein determining a viewing pose for viewing an image based on the plurality of points further includes:

after determining the average location of the plurality of points, removing one point of the projected plurality of points located farthest from the average location of the projected plurality of points and recalculating the average location of any remaining points of the projected plurality of points until the average location of the any remaining points is at least a minimum distance from a center of the shape; and when the average location of the any remaining points is at least the minimum distance from the center of the shape, using the average location of the any remaining points to determine the viewing pose.

* * * * *